United States Patent
Becker et al.

(10) Patent No.: US 11,639,228 B2
(45) Date of Patent: May 2, 2023

(54) ENGINE LAYOUTS AND ASSOCIATED COMPARTMENTALIZATION FOR AIRCRAFT HAVING HYBRID-ELECTRIC PROPULSION SYSTEM

(71) Applicant: Pratt & Whitney Canada Corp., Longueuil (CA)

(72) Inventors: Frank Becker, Saint Lambert (CA); Eric LaTulipe, Sainte-Julie (CA); Xi Wang, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 199 days.

(21) Appl. No.: 16/708,699

(22) Filed: Dec. 10, 2019

(65) Prior Publication Data

US 2020/0277066 A1    Sep. 3, 2020

Related U.S. Application Data

(60) Provisional application No. 62/812,342, filed on Mar. 1, 2019.

(51) Int. Cl.
| | |
|---|---|
| *B64D 27/24* | (2006.01) |
| *B64D 29/00* | (2006.01) |
| *B64D 27/10* | (2006.01) |
| *B64D 33/08* | (2006.01) |
| *B64D 27/02* | (2006.01) |

(Continued)

(52) U.S. Cl.
CPC .............. *B64D 27/24* (2013.01); *B64D 27/02* (2013.01); *B64D 27/10* (2013.01); *B64D 29/00* (2013.01); *B64D 31/12* (2013.01); *B64D 33/08* (2013.01); *B64D 35/08* (2013.01); *B64D 2027/026* (2013.01)

(58) Field of Classification Search
CPC .. B64D 27/02; B64D 2027/026; B64D 27/10; B64D 27/24; B64D 29/00; B64D 31/12; B64D 33/08; B64D 35/08
USPC ........................................................... 244/55
See application file for complete search history.

(56) References Cited

U.S. PATENT DOCUMENTS

| | | |
|---|---|---|
| 2,685,420 A | 8/1954 | Burnelli et al. |
| 4,829,850 A | 5/1989 | Soloy |
| 6,703,747 B2 | 3/2004 | Kawamura |

(Continued)

FOREIGN PATENT DOCUMENTS

| | | |
|---|---|---|
| BR | PI0622106 A2 | 12/2011 |
| BR | 102014025950 A2 | 5/2016 |

(Continued)

OTHER PUBLICATIONS

International Search Report and Written Opinion Issued in corresponding PCT Application No. PCT/US2019/065351, dated Apr. 3, 2020.

(Continued)

*Primary Examiner* — Brady W Frazier
(74) *Attorney, Agent, or Firm* — Norton Rose Fulbright Canada LLP

(57) ABSTRACT

A power plant a for an aircraft having a hybrid-electric propulsion system including a nacelle body including therein an electric motor directly connected to a gearbox for driving a propeller, wherein the gearbox is connected directly to a heat motor for driving the propeller, and at least one heat exchanger for cooling the electric motor or the heat motor.

7 Claims, 3 Drawing Sheets

(51) Int. Cl.
*B64D 31/12* (2006.01)
*B64D 35/08* (2006.01)

(56) References Cited

U.S. PATENT DOCUMENTS

| | | | |
|---|---|---|---|
| 6,864,667 | B2 | 3/2005 | Buening et al. |
| 7,122,933 | B2 | 10/2006 | Horst et al. |
| 7,915,778 | B2 | 3/2011 | Miyata et al. |
| 8,350,437 | B2 | 1/2013 | Doushita et al. |
| 8,358,046 | B2 | 1/2013 | Platon |
| 8,368,276 | B2 | 2/2013 | Wolf et al. |
| 8,532,961 | B2 | 9/2013 | Guo |
| 8,844,143 | B2 | 9/2014 | Kirchner et al. |
| 9,174,741 | B2 | 11/2015 | Suntharalingam et al. |
| 10,145,291 | B1 | 12/2018 | Thomassin |
| 10,170,954 | B2 | 1/2019 | Taniguchi et al. |
| 10,326,326 | B2 | 6/2019 | Laldin et al. |
| 10,494,117 | B2 | 12/2019 | Bosma |
| 2003/0094537 | A1* | 5/2003 | Austen-Brown ... B64C 29/0033 244/7 R |
| 2005/0237766 | A1 | 10/2005 | Klettke |
| 2008/0006739 | A1 | 1/2008 | Mochida et al. |
| 2008/0017426 | A1 | 1/2008 | Walters et al. |
| 2008/0078876 | A1 | 4/2008 | Baggette et al. |
| 2008/0141921 | A1 | 6/2008 | Hinderks |
| 2010/0251692 | A1 | 10/2010 | Kinde, Sr. |
| 2010/0270417 | A1 | 10/2010 | Goldshteyn |
| 2011/0024555 | A1 | 2/2011 | Kuhn, Jr. |
| 2011/0049293 | A1 | 3/2011 | Koletzko |
| 2011/0108663 | A1 | 5/2011 | Westenberger |
| 2012/0012692 | A1 | 1/2012 | Kroo |
| 2012/0111994 | A1 | 5/2012 | Kummer et al. |
| 2012/0227389 | A1 | 9/2012 | Hinderks |
| 2013/0020429 | A1 | 1/2013 | Kroo |
| 2013/0068876 | A1 | 3/2013 | Radu |
| 2013/0157017 | A1 | 6/2013 | Guillemaut et al. |
| 2014/0180507 | A1 | 6/2014 | Geay et al. |
| 2014/0333127 | A1 | 11/2014 | Edwards |
| 2015/0013306 | A1* | 1/2015 | Shelley ............... F02K 5/00 60/224 |
| 2015/0183518 | A1 | 7/2015 | Stuckl et al. |
| 2015/0210407 | A1 | 7/2015 | Griffin et al. |
| 2015/0321752 | A1 | 11/2015 | Trull et al. |
| 2016/0023747 | A1 | 1/2016 | Kempshall |
| 2016/0115864 | A1* | 4/2016 | Campbell ............. F02C 7/14 29/888.012 |
| 2016/0144957 | A1 | 5/2016 | Claridge et al. |
| 2016/0221680 | A1 | 8/2016 | Burton et al. |
| 2016/0272310 | A1 | 9/2016 | Chan et al. |
| 2016/0304199 | A1 | 10/2016 | Chan et al. |
| 2016/0347446 | A1 | 12/2016 | Vetter et al. |
| 2017/0037756 | A1* | 2/2017 | Julien ................. F02K 1/386 |
| 2017/0211474 | A1* | 7/2017 | Sennoun ............... F02C 6/00 |
| 2017/0320585 | A1 | 11/2017 | Armstrong et al. |
| 2017/0327219 | A1 | 11/2017 | Alber |
| 2017/0335713 | A1* | 11/2017 | Klemen ................ H02K 9/19 |
| 2017/0341725 | A1 | 11/2017 | Skahan |
| 2018/0045068 | A1 | 2/2018 | Brinson et al. |
| 2018/0050810 | A1* | 2/2018 | Niergarth ............ F01D 15/12 |
| 2018/0127103 | A1 | 5/2018 | Cantemir |
| 2018/0138767 | A1* | 5/2018 | Moore ............... H02K 1/2706 |
| 2018/0141655 | A1 | 5/2018 | Wall |
| 2018/0163558 | A1 | 6/2018 | Vondrell et al. |
| 2018/0208305 | A1 | 7/2018 | Lloyd et al. |
| 2018/0215462 | A1 | 8/2018 | Fenny et al. |
| 2018/0244383 | A1* | 8/2018 | Valente ................ B64C 39/10 |
| 2019/0128570 | A1* | 5/2019 | Moxon ............... H01M 10/613 |
| 2019/0256214 | A1* | 8/2019 | Dionne ................ B64D 33/08 |

FOREIGN PATENT DOCUMENTS

| | | |
|---|---|---|
| EP | 3594125 A1 | 1/2020 |
| JP | 2014159255 A | 9/2014 |
| JP | 2015006650 A | 1/2015 |
| JP | WO2017126584 A1 | 12/2018 |
| KR | 1020040008414 | 1/2004 |
| KR | 200408970 Y1 | 2/2006 |
| KR | 20070039699 A | 4/2007 |
| KR | 101277645 B1 | 6/2013 |
| KR | 20150018018 A | 2/2015 |
| KR | 101513661 B | 4/2015 |
| KR | 101659783 B1 | 9/2016 |
| KR | 101752859 B1 | 6/2017 |
| KR | 101797011 B1 | 11/2017 |
| WO | 2009053649 A1 | 4/2009 |
| WO | 2010020199 A1 | 2/2010 |
| WO | 2011005066 A2 | 1/2011 |
| WO | 2018058137 A1 | 3/2018 |
| WO | 2018/089067 | 5/2018 |
| WO | 2018099856 A1 | 6/2018 |
| WO | 2018104929 A1 | 6/2018 |

OTHER PUBLICATIONS

Extended European Search Report for European Patent Application No. EP19918043.1, dated Oct. 19, 2022.

Anonymous: "Oil Cooled Electric Motors," Jul. 19, 2017 (Jul. 19, 2017), pp. 1-12, XP055969372. Retrieved from the Internet: URL:https://www.combimac.com/oil-cooled-electric-motors.html (retrieved on Oct. 10, 2022).

* cited by examiner

ENGINE LAYOUTS AND ASSOCIATED COMPARTMENTALIZATION FOR AIRCRAFT HAVING HYBRID-ELECTRIC PROPULSION SYSTEM

CROSS-REFERENCE TO RELATED APPLICATIONS

This application claims priority to U.S. Provisional Patent Application No. 62/812,342 filed Mar. 1, 2019 the contents of which are incorporated by reference herein in their entirety.

BACKGROUND

Technological Field

The subject invention is directed to an engine compartment layout in an aircraft, and more particularly, to an engine compartment layout in the nacelle of an aircraft having a hybrid-electric propulsion system.

Description of Related Art

The level of air traffic continues to increase worldwide, leading to increased fuel consumption and air pollution. Consequently, efforts are underway to make aircraft more environmentally compatible through the use of specific types of fuel and/or by reducing fuel consumption through the use of more efficient drive systems.

For example, aircraft having mixed drive systems that include a combination of various types of engines are known for reducing pollutants and increasing efficiency. Some current combinations include reciprocating engines and jet engines, reciprocating engines and rocket engines, jet engines and rocket engines, or turbojet engines and ramjet engines.

While these mixed drive systems are useful, they are not readily adaptable for use on commercial passenger aircraft. However, hybrid-electric propulsion systems that provide power through a combustion engine and an electric motor are indeed adaptable for use with commercial passenger aircraft and can provide efficiency benefits including reduced fuel consumption. The subject invention is directed to an aircraft having such a propulsion system. The conventional methods and systems have generally been considered satisfactory for their intended purpose. However, there is still a need in the art for a propulsion system having improved weight savings and a reduced size. The present disclosure may provide a solution for at least one of these remaining challenges.

SUMMARY OF THE INVENTION

A power plant for an aircraft having a hybrid-electric propulsion system which includes a nacelle body including therein, an electric motor directly connected to a gearbox for driving a propeller, the gearbox being connected directly to a heat motor for driving the propeller, and at least one heat exchanger for cooling the electric motor or the heat motor. The power plant can include a turbine compressor assembly located below the gearbox.

The power plant can include a turbine compressor assembly located aft of the heat motor, wherein the turbine compressor assembly is partially surrounded by an exhaust duct and can also partially be within a landing gear section of the nacelle body. The landing gear section can separated from a power plant section by a bulkhead.

The electric motor can include 5 pole pairs and a distributed winding type, wherein a fundamental frequency of the electric motor is at or above 1000 Hz. The electric motor can be oil cooled. The electric motor can be located above the heat motor.

The electric motor and the heat motor can be connected to a reduction gearbox and an oil sump tank located aft of the electric motor and the oil sump tank can be located above the heat motor. The electric motor and the heat motor can be arranged to produce counteracting vibrations.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
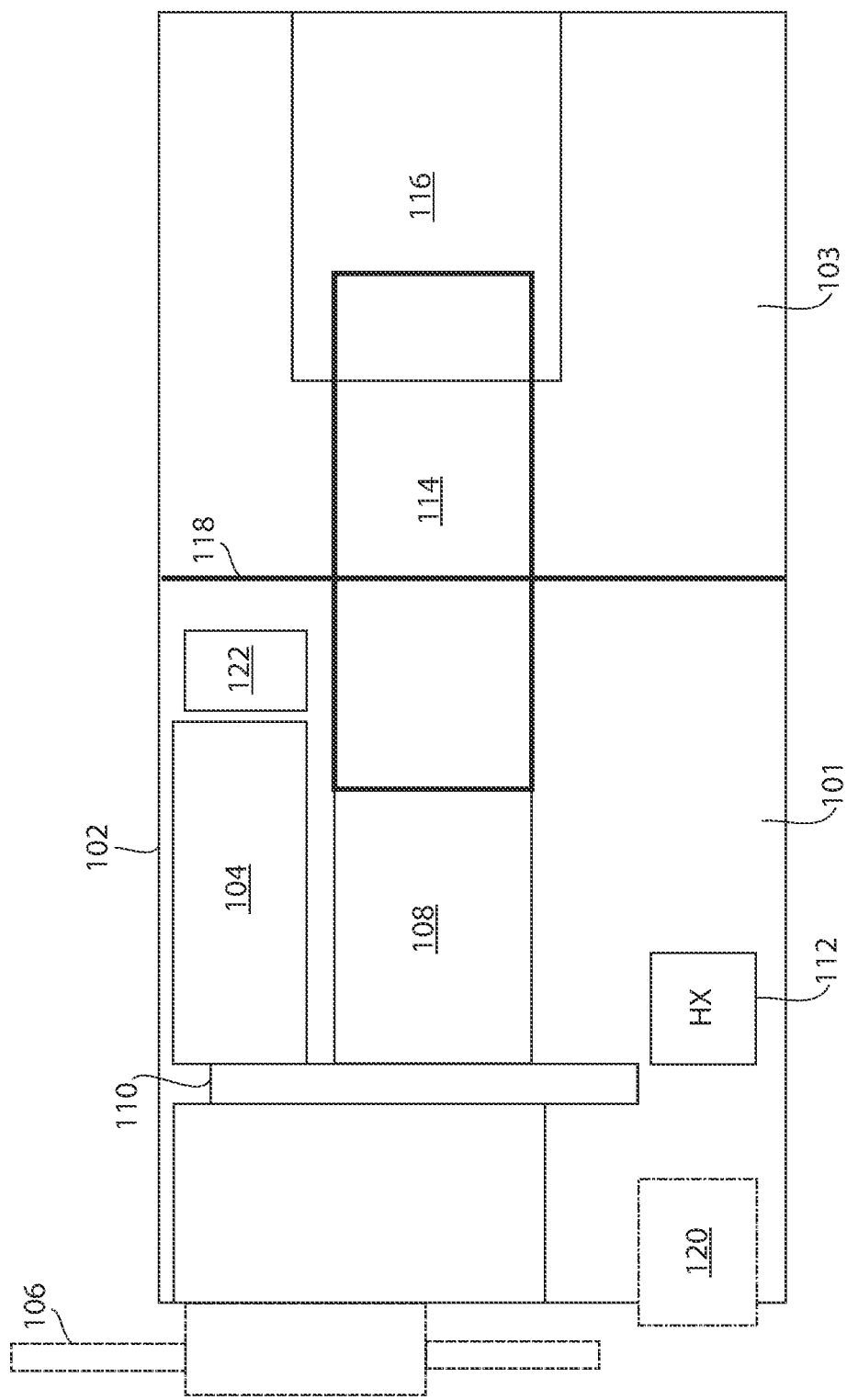
FIG. 1 is a schematic view of a system configuration of an engine nacelle of an aircraft having hybrid-electric propulsion system.

Reference will now be made to the drawings wherein like reference numerals identify similar structural features or aspects of the subject invention. For purposes of explanation and illustration, and not limitation, a partial view of an exemplary embodiment of a hybrid-electric propulsion system in accordance with the invention is shown in FIG. 1 and is designated generally by reference character 100. Other embodiments of hybrid-electric propulsion system in accordance with the invention, or aspects thereof, are provided in FIGS. 2 and 3, as will be described. The methods and systems of the invention can be used to improve efficiencies of aircraft.

As seen in FIG. 1, a power plant 101 for an aircraft having a hybrid-electric propulsion system includes a nacelle 102 including within itself, an electric motor 104 directly connected to a gearbox 110 (e.g., a reduction gearbox ("RGB") for driving a propeller 106, the gearbox 110 being connected directly to a heat motor 108 for driving the propeller 106, and at least one heat exchanger 112 for cooling the electric motor 104 or the heat motor 108. An oil sump tank 122 is located aft of the electric motor and the oil sump tank be located above the heat motor 108. It is envisioned that the heat motor of the hybrid-electric propulsion system could be a heat engine of any type, e.g., a gas turbine, spark ignited, diesel, rotary or reciprocating engine of any fuel type and with any configuration of turbomachinery elements, either turbocharger, turbosupercharger, supercharger and exhaust recovery turbo compounding, either mechanically, electrically, hydraulically or pneumatically driven. An example of a rotary engine suitable for this application is disclosed in U.S. Pat. No. 10,145,291, the disclosure of which is herein incorporated by reference in its entirety.

The power plant 101 includes a turbine compressor 114 assembly located aft of the heat motor 108, wherein the turbine compressor 114 assembly is partially surrounded by an exhaust duct 116 and also extends partially into a landing gear section 103 of the nacelle body. The landing gear section 103 can separated from the power plant 101 by a bulkhead 118. The nacelle 102 in general can include a power plant 101 and a landing gear section 103. The sections can be delimited by a bulkhead 118 dividing each of the sections from an adjacent section.

Figure 2:
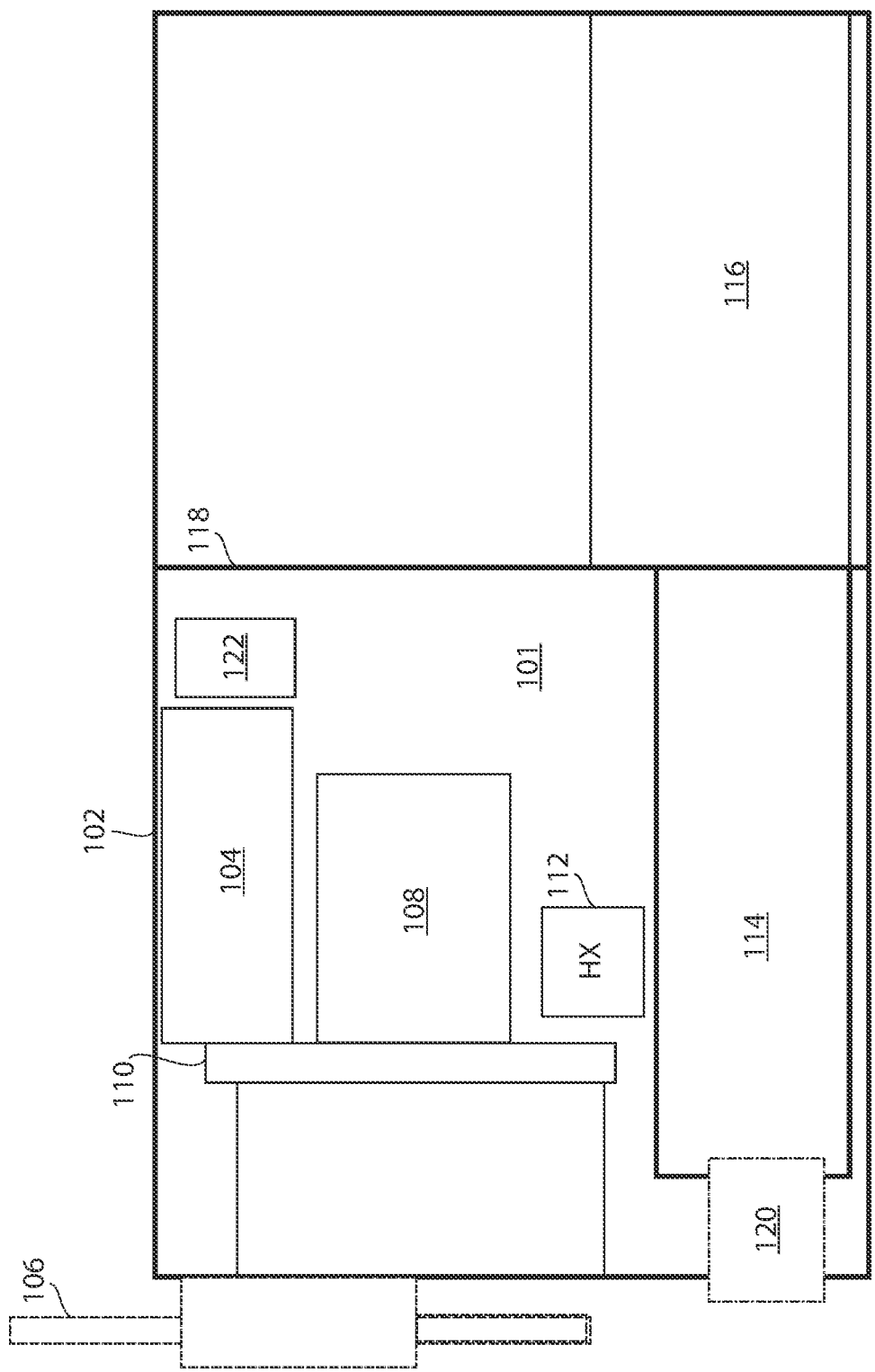
FIG. 2 is a schematic view of a system configuration of an engine nacelle of an aircraft having hybrid-electric propulsion system.

Referring specifically to FIG. 2, it is also conceived that the turbine compressor 114 can be located below the gearbox 110, with at least a portion the turbine compressor 114 located fore of the gearbox 110, and proximate to an inlet 120 from outside the nacelle.

Figure 3:
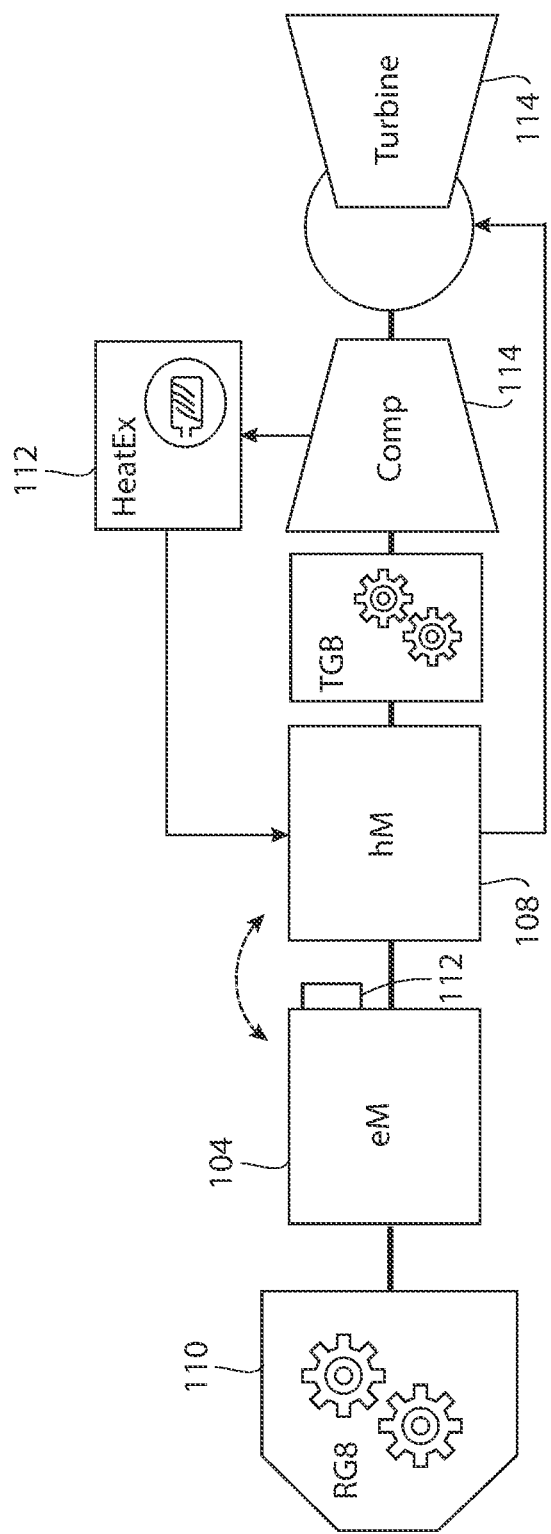
FIG. 3 is a schematic view of a system with an inline configuration.

As can be seen in FIG. 3, the power plant 101 can be arranged in line such that the electric motor 104 and the heat motor 108 are connected to the gearbox 110 and are coaxial and inline. The electric motor 104 and the heat motor 108 can be arranged to produce counteracting vibrations. The rotary ripples produced from the torque of the heat motor 108 can be counteracted and controlled by the electric motor 104. This arrangement reduces the need for dampeners, flywheels, and other methods of reducing controlling natural frequencies. In this configuration, a reduction gearbox is connected to an electric motor, which is in connected in line to a heating motor, which is connected in line to a turbine assembly gearbox ("TGB").

The methods and systems of the present disclosure, as described above and shown in the drawings, provide for hybrid power system with superior properties including increased reliability and stability, and reduced size, weight, complexity, and/or cost. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A power plant for an aircraft having a hybrid-electric propulsion system comprising:
    a nacelle body including therein:
        an electric motor directly connected to a gearbox for driving a propeller;
        the gearbox being connected directly to a heat motor for driving the propeller;
        at least one heat exchanger for cooling the electric motor or the heat motor; and
        a turbine compressor assembly positioned below and at least partially forward the gearbox.

2. The power plant of claim 1, wherein the turbine compressor assembly is partially aft of the heat motor.

3. The power plant of claim 1, wherein, the nacelle body further includes a landing gear section and a powerplant section, wherein the landing gear section is separated from the power plant section by a bulkhead.

4. The power plant of claim 1, wherein the electric motor is oil cooled.

5. The power plant of claim 1, wherein the electric motor is located above the heat motor.

6. The power plant of claim 1, further comprising an oil sump tank located aft of the electric motor.

7. The power plant of claim 6, wherein the oil sump tank is above the heat motor.

* * * * *